United States Patent
Bossa et al.

(10) Patent No.: US 10,210,220 B2
(45) Date of Patent: Feb. 19, 2019

(54) SYSTEM AND METHOD FOR FAULT TOLERANT QUERIES

(71) Applicant: DataStax, Santa Clara, CA (US)

(72) Inventors: Sergio Bossa, London (GB); Caleb William Rackliffe, Yorba Linda, CA (US); Edward de Oliveira Ribeiro, Brasilia (BR)

(73) Assignee: DataStax, Santa Clara, CA (US)

(*) Notice: Subject to any disclaimer, the term of this patent is extended or adjusted under 35 U.S.C. 154(b) by 418 days.

(21) Appl. No.: 14/856,001

(22) Filed: Sep. 16, 2015

(65) Prior Publication Data
US 2017/0075946 A1   Mar. 16, 2017

(51) Int. Cl.
| | | |
|---|---|---|
| G06F 7/00 | (2006.01) | |
| G06F 17/30 | (2006.01) | |
| G06F 11/14 | (2006.01) | |
| G06F 11/20 | (2006.01) | |

(52) U.S. Cl.
CPC ........ G06F 17/30545 (2013.01); G06F 11/14 (2013.01); G06F 11/2023 (2013.01)

(58) Field of Classification Search
CPC .................................................. G06F 11/2023
USPC .......................................................... 707/652
See application file for complete search history.

(56) References Cited

U.S. PATENT DOCUMENTS

| | | | | |
|---|---|---|---|---|
| 6,269,351 B1* | 7/2001 | Black | ................ | G06F 17/3061 706/15 |
| 7,246,143 B2* | 7/2007 | Hu | ................ | G06F 17/142 708/404 |
| 7,290,131 B2* | 10/2007 | Beynon | ................ | G06F 17/30887 707/E17.115 |
| 8,340,690 B2* | 12/2012 | Wong | ................ | H04W 4/02 455/456.3 |
| 8,478,710 B2* | 7/2013 | Andreoli | ................ | G06Q 10/06 703/2 |
| 8,661,422 B2* | 2/2014 | Lethin | ................ | G06F 12/023 717/151 |
| 8,887,056 B2* | 11/2014 | Breternitz | ................ | G06F 9/505 715/735 |
| 8,930,926 B2* | 1/2015 | Bastoul | ................ | G06F 8/453 717/119 |
| 9,665,633 B2* | 5/2017 | Dageville | ................ | G06F 9/5016 |
| 9,858,053 B2* | 1/2018 | Lethin | ................ | G06F 8/443 |
| 2014/0047341 A1* | 2/2014 | Breternitz | ................ | G06F 9/505 715/735 |
| 2015/0234688 A1* | 8/2015 | Dageville | ................ | G06F 9/5016 718/105 |
| 2016/0070745 A1* | 3/2016 | Bender | ................ | G06F 17/30094 707/696 |

(Continued)

*Primary Examiner* — Eliyah S. Harper
(74) *Attorney, Agent, or Firm* — Gard & Kaslow LLP

(57) ABSTRACT

Fault tolerant querying of data distributed across multiple nodes is accomplished by each node determining and reporting its own health status and indexing status to the other nodes in the cluster via a gossip protocol. A coordinator node then prioritizes replica nodes based on the received status of the other nodes and sends query requests to those nodes based on the prioritization. Should a node fail to provide an response to a query request, further query requests are sent to a next highest priority replica node containing the relevant data. This results in improved query performance by avoiding busy nodes and further provides a fault tolerant approach to data queries.

15 Claims, 5 Drawing Sheets

(56) References Cited

U.S. PATENT DOCUMENTS

2016/0179642 A1* 6/2016 Cai .................... G06F 11/2033
714/4.12

* cited by examiner

US 10,210,220 B2

SYSTEM AND METHOD FOR FAULT TOLERANT QUERIES

FIELD OF THE INVENTION

The present invention relates generally to queries of large data stores, and more particularly to queries performed on distributed, replicated data stores.

BACKGROUND OF THE INVENTION

As businesses increasingly depend on data and data size continues to increase the importance of rapid and reliable queries on such data increases.

Further, data processing has moved beyond the world of monolithic data centers housing large mainframe computers with locally stored data repositories, which is easily managed and protected. Instead, today's data processing is typically spread across numerous, geographically disparate computing systems communicating across multiple networks.

One well-known distributed database example is a No-SQL (Not Only Structured Query Language) database called Cassandra, which is designed to handle big data workloads across multiple nodes with no single point of failure. Its architecture is based on the understanding that system and hardware failures can and do occur. In one sense, Cassandra addresses the problem of failures by employing a peer-to-peer distributed system across homogenous nodes where data is regularly and periodically distributed via replication amongst all the nodes in a cluster. Referring now to FIG. 1, a simplified example of the Cassandra architecture can be seen. While oftentimes thought of and referred to as a ring architecture, fundamentally it comprises a cluster of nodes 100 (e.g., Node 1, Node 2 and Node 3, each of which is typically running on a physically separate server computing system) communicating with each other across a network (e.g., Network 110) such as a local area network, a wide area network or the internet.

Referring now to FIG. 2, an exemplary prior art cluster of nodes 200 can be seen. The data in this cluster is distributed across the nodes (labeled Node 1, Node 2, Node 3, Node 4 and Node 5 in this example) which can be visualized as a ring, labeled 201 in the figure. This data distribution is both by range or partition of the overall dataset as well as by replication of the data across multiple nodes in accordance with a replication factor N specifying how many copies of a given data partition are to be replicated to other nodes in the cluster. For example, as can be seen in the figure, the dataset has been partitioned such that partition P1(0,250], which covers data ranging from 0 to 250 in the dataset, is separate from partition P2(250,500], which covers data ranging from 250 to 500 in the dataset, and partition P1 can be found stored in Node 1, Node 2 and Node 3 while partition P2 can be found stored in Node 2, Node 3 and Node 4. It is to be understood that such data partitioning and replication is known in the art.

Further, all nodes in Cassandra are peers and a client (i.e., an external facility configured to access a Cassandra node, typically via a JAVA API (application program interface)) can send a read or write request to any node in the cluster, regardless of whether or not that node actually contains and is responsible for the requested data. There is no concept of a master or slave, and nodes dynamically learn about each other through what is known as a gossip broadcast protocol where information is simply passed along from one node to another in the cluster rather than going to or through any sort of central or master functionality.

A node that receives a client query (e.g., a read or search operation) is commonly referred to as a coordinator for the client query; it facilitates communication with the other nodes in the cluster responsible for the query (contacting at least n replica nodes to satisfy the client query's consistency level), merges the results, and returns a single client query result from the coordinator node to the client.

For example, if Node 5 receives a client query from a client then Node 5 becomes the coordinator for that particular client query. In handling that client query, coordinator Node 5 identifies, using techniques known in the art, which other nodes contain data partitions relevant to the client query. For example, if the client query is with respect to data partitions 0 through 1000, then in this example, Node 1 (containing partition P4(750,1000] and partition P1(0,250]), Node 2 (containing partition P1(0,250] and partition P2(250, 500]), Node 3 (containing partition P1(0,250], partition P2(250,500], and partition P3(500750]), Node 4 (containing partition P2(250,500], partition P3(500,750] and partition P4(750,1000]) and Node 5 (containing partition P3(500, 750] and partition P4(750,1000]) are all identified. As a result, coordinator Node 5 may send a query request 203 to Node 3 with respect to data partitions P1, P2 and P3. However, should Node 3 fail to answer the query request with a query response for any of various known reasons, the entire distributed query fails. Assuming a 0.1% chance of failure at any given node, this would produce approximately a 10% client query failure rate for distributed queries that contact 100 nodes.

Fault tolerance techniques already exist, but they are usually applied to simple, single-record queries. Techniques that exist for fault tolerance over complex, multi-record queries rely on concurrently executing multiple queries against replicas of the same data, which is not optimal in terms of network and computing resource usage.

What is needed, therefore, is a simple query approach that is tolerant of such faults which still providing the benefits of querying data distributed across multiple nodes.

SUMMARY OF THE INVENTION

One embodiment discloses a fault tolerant query method comprising: determining, by each node in a cluster, a health status of each node in a cluster; determining, by each node in the cluster, an indexing status of each node in the cluster; communicating, from each node in the cluster to each other node in the cluster, the determined health status and the determined indexing status of each node in the cluster; receiving a client query at a first node in the cluster; determining, by the first node in the cluster, which nodes in the cluster contain data partitions relevant to the received client query; prioritizing, by the first node in the cluster, the determined nodes based on the received health index status and indexing status of the determined nodes; sending query requests from the first node in the cluster to one or more of the determined nodes having a higher priority than one or more other of the determined nodes having a lower priority; receiving by the first node query responses from the one or more of the determined nodes having a higher priority; sorting by the first node the received query responses into a query result; and sending the query result from the first node to the client.

Another embodiment discloses a fault tolerant system comprising: a cluster of nodes, each node in the cluster configured to: determine its health status; determine its indexing status; and communicate its determined health status and determined indexing status to each other node in the cluster; at least one node in the cluster configured to: receive a client query, determine which nodes in the cluster contain data partitions relevant to the received client query; prioritize the determined nodes based on the communicated health status and index status of the determined nodes; send query requests to one or more of the determined nodes having a higher priority than one or more other of the determined nodes having a lower priority; receive query responses from the one or more of the determined nodes having a higher priority; sort the received query responses into a query result; and send the query result to the client.

A still further embodiment discloses a non-transitory computer readable storage medium having embodied thereon a program, the program executable by a processor to perform a fault tolerant query method, the method comprising the steps of: determining, by each node in a cluster, a health status of each node in a cluster; determining, by each node in the cluster, an indexing status of each node in the cluster; communicating, from each node in the cluster to each other node in the cluster, the determined health status and the determined indexing status of each node in the cluster; receiving a client query at a first node in the cluster; determining, by the first node in the cluster, which nodes in the cluster contain data partitions relevant to the received client query; prioritizing, by the first node in the cluster, the determined nodes based on the received health index status and indexing status of the determined nodes; sending query requests from the first node in the cluster to one or more of the determined nodes having a higher priority than one or more other of the determined nodes having a lower priority; receiving by the first node query responses from the one or more of the determined nodes having a higher priority; sorting by the first node the received query responses into a query result; and sending the query result from the first node to the client.

DETAILED DESCRIPTION OF THE INVENTION

A method and apparatus is disclosed for fault tolerant querying of data distributed across multiple nodes. In this approach, each node determines and reports its own health status and indexing status to the other nodes in the cluster via a gossip protocol. A coordinator node then prioritizes replica nodes based on the received status of the other nodes and sends query requests to those nodes based on the prioritization. Then, should a node fail to provide a response to a query request, further query requests are sent to a next highest priority replica node containing the relevant data. This provides improved query performance by avoiding sending query requests to busy nodes and, further, provides a fault tolerant approach to data queries by handling lack of response in a failover, prioritized manner.

Figure 1:
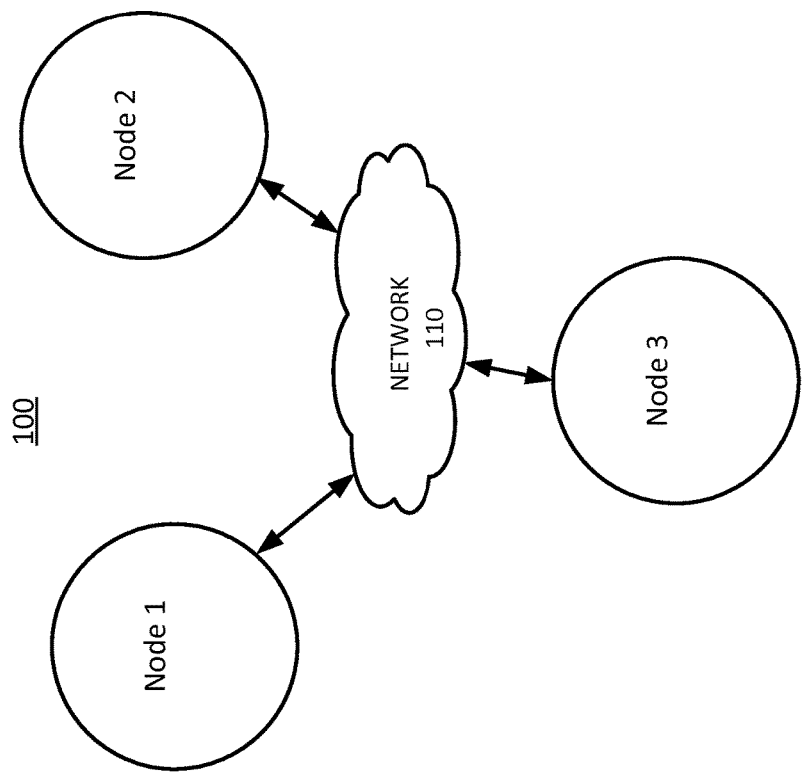
FIG. 1 is an illustration of an example Cassandra node architecture.
Figure 2:
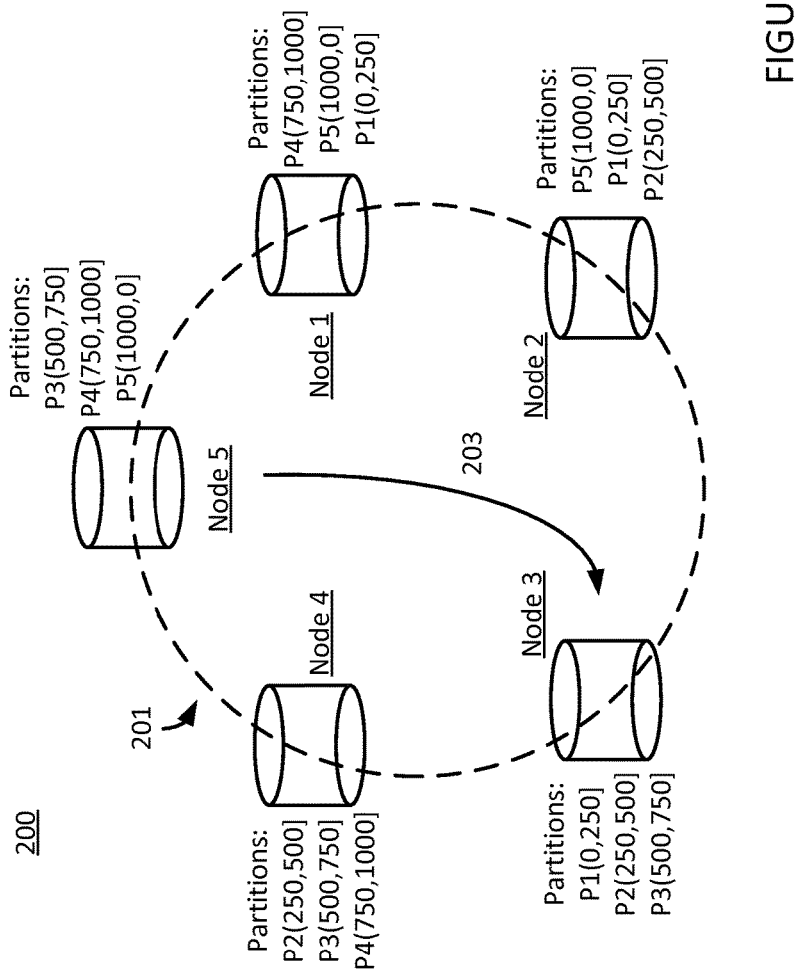
FIG. 2 is an example prior art cluster of nodes.
Figure 3:
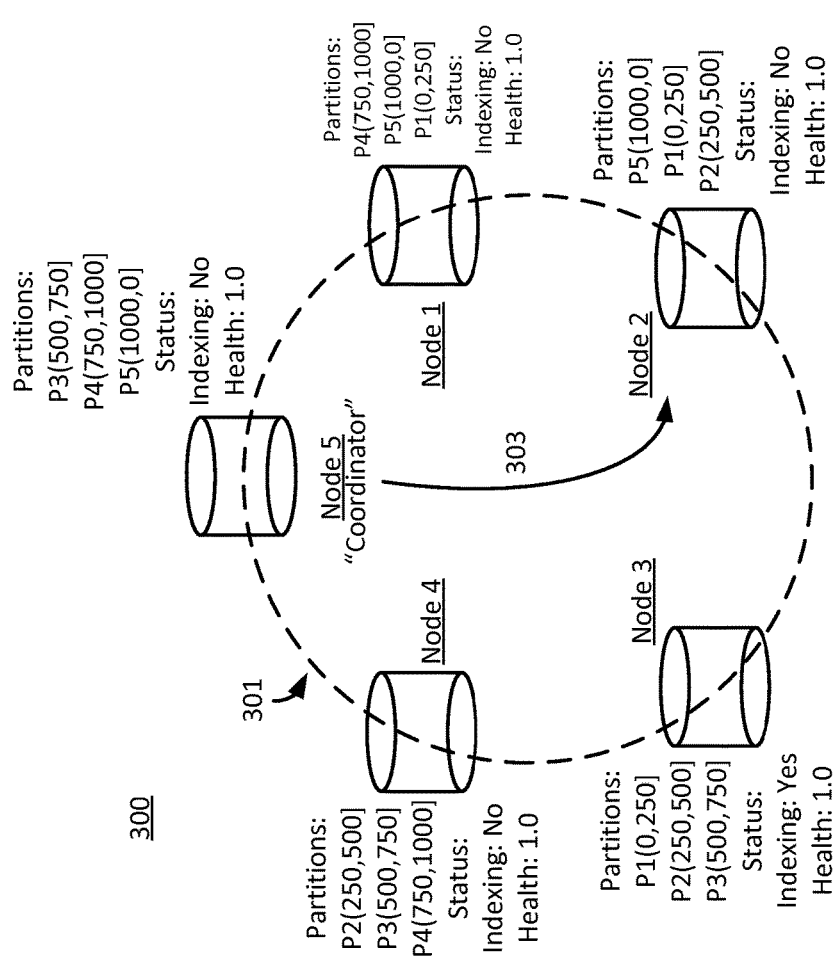
FIGS. 3 and 4 are illustrations of an example improved performance, fault tolerant query according to the present approach.

Referring now to FIG. 3, an illustration of an example improved performance, fault tolerant query according to the present approach will now be explained. As with the node cluster of FIG. 2, this cluster 300 includes Nodes 1, 2, 3, 4 and 5, each of which can be visualized as a ring 301 of nodes containing distributed and partitioned data. Additionally, as can be seen in FIG. 3, each node also has an indexing status and a health status which it has determined and communicated via a gossip broadcast protocol throughout the ring 301 to the other nodes in the cluster 300, each of which maintains a local store of the received status information of the other nodes in the cluster.

The indexing status of a node is an indication of whether the node is currently undergoing a reindexing of its dataset partitions (a known resource-intensive process of, e.g., rebuilding an inverted index structure to be used in search operations) or if a most recent reindexing operation had failed, each as would be understood by one of skill in the art and readily known or determinable by a node according to known techniques. Indexing status is a valuable metric to determine node ranking, as explained elsewhere herein, because reindexing can be a costly yet frequently occurring operation on nodes of large, distributed clusters where hardware or software failures are more common.

The health status of a node is an indication of how likely the node is to provide correct data. As would be understood by one of skill in the art in light of the teachings herein, data is correct or up-to-date when it meets consistency requirements set by the client at write time. As also understood by one of skill in the art, correct data is data that is up-to-date because all mutative requests or changes to the data have been correctly processed or made. In a preferred embodiment, the health status of a node is calculated according to a formula as explained more fully elsewhere herein.

In accordance with the present approach, when a node receives a client query (e.g., a full-text client query) from a client, thereby becoming a coordinator node, the coordinator node prioritizes, or places in rank order, the set of replica nodes according to the status information received from the other nodes via the gossip exchanges, ranking higher those nodes which are not reindexing and whose last reindexing completed successfully and ranking higher those nodes with a higher health status.

This can be seen in the example of FIG. 3 where a query request 303, relevant to a client query relevant to data partitions in a range of 0-1000, is shown being sent from coordinator Node 5 to replica Node 2, containing partitions P1 and P2, rather than to replica Node 3, despite Node 3 containing partitions P1, P2 and P3. The query request was sent to Node 2 rather than Node 3, despite Node 3 containing a larger number of partitions relevant to the client query than Node 2, because Node 3 has an indexing status of "Yes" indicating that Node 3 is currently busy performing a reindexing operation while Node 2 has an indexing status of "No" indicating that Node 2 is not currently busy performing a reindexing operation. As such, the present approach avoids sending a query request to a replica node that is currently busy and therefore unlikely or unable to respond. This can be viewed as a first level of performance improvement provided by the present approach.

Figure 4:
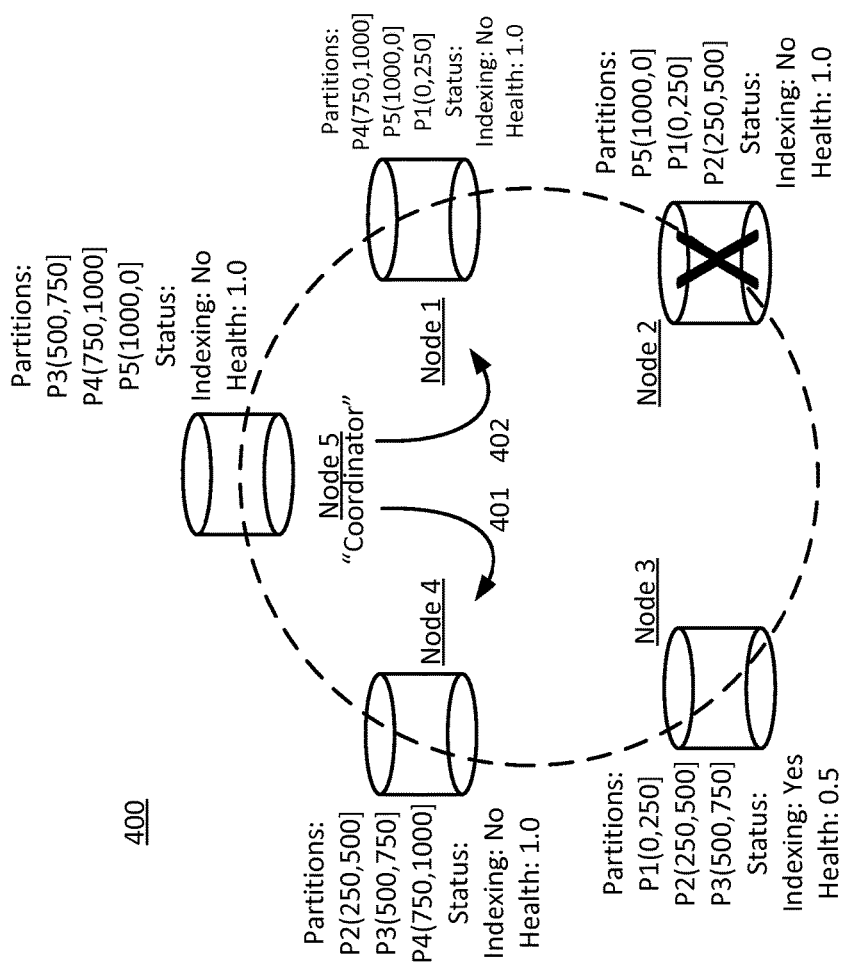

However, as sometimes occurs, Node 2 might fail before it can send its query response back to Node 5. Such an occurrence is addressed in the present approach, in what can be viewed as a second level of performance improvement or fault tolerance provided by the present approach, as will now be explained. Referring now to FIG. 4, the same cluster of nodes shown in FIG. 3 can be seen with Node 2 incurring a failure condition, as indicated by the large "X" overlaid on Node 2.

Coordinator Node 5, not having received a query response from Node 2, will then send a query request to the next highest priority replica node(s) in the cluster containing replicas of the data partitions contained in Node 2 (i.e., P1 and P2) that were relevant to the client query. In this example, this results in coordinator Node 5 sending a query request to Node 1 (which contains partition P1) and another query request to Node 4 (which contains partition P2).

Coordinator Node 5 then sorts the query responses received from the replica nodes, such sorting done by score or other relevancy factor using techniques known in the art, into a client query result and provides the client query result to the client who made the client query.

Figure 5:
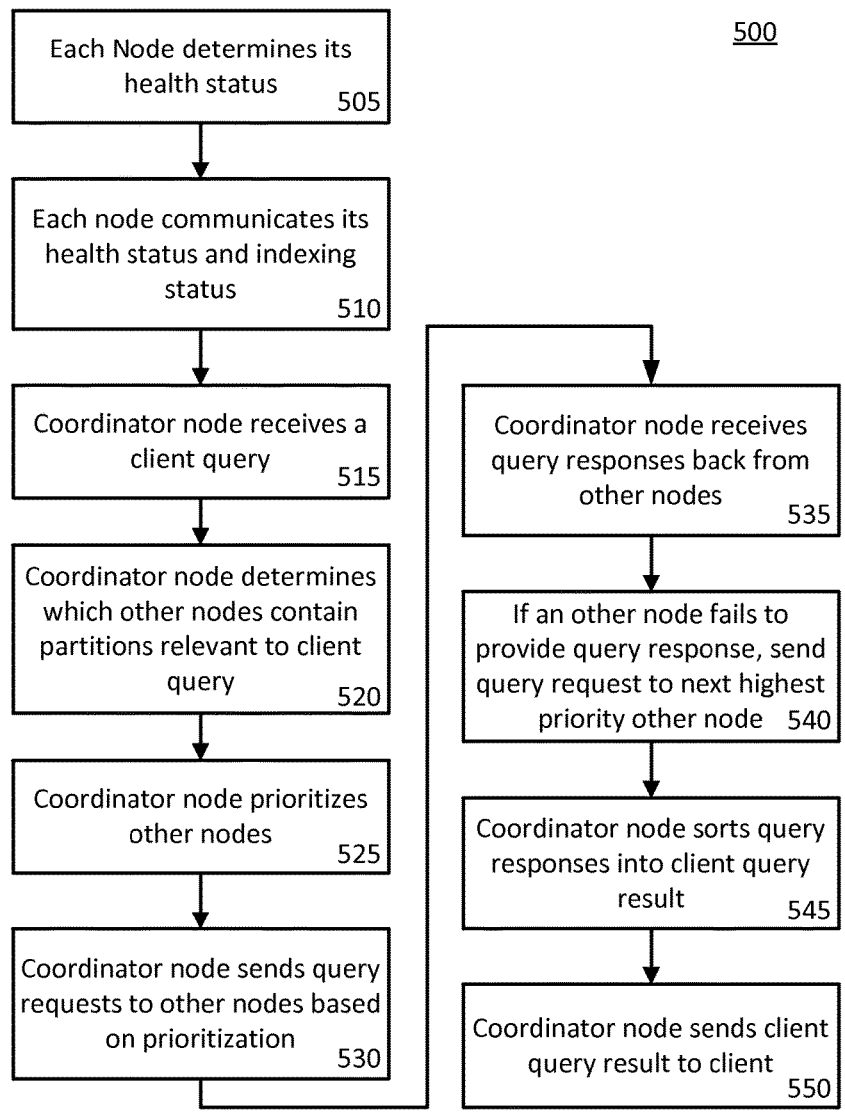
FIG. 5 is a flowchart of a process of performing an improved performance, fault tolerant query according to an embodiment.

Referring now to FIG. 5, a flowchart of one embodiment of a method 500 of the present approach can be seen.

In step 505, each node in the cluster determines its own health status. In a preferred embodiment, a node determines its health status according to the following formula:

Node Health=node uptime/(1+dropped updates)

where node uptime is a measure of how long the node has been running without incurring a failure, measured in milliseconds and reduced to a number between 0 (minimum time) and 1 (maximum time) according to the following function:

round(100×(uptime×smoothing constant)/(1+uptime× smoothing constant))/100 where round is a known mathematical rounding function, the smoothing constant is a constant factor to cap or limit the maximum uptime, which has been found to be optimal at approximately one day, corresponding to a value of 0.0012, and where dropped updates are the exponentially weighted moving average of the number of "lost" updates/mutations caused by the node applying any load shedding or backpressure techniques to reduce node resource usage and stay operational. As is known in the art, an update is a received change to be made to data stored in a node, otherwise known as a mutation. The resulting node health value is a decimal value between 0 (unhealthy) and 1 (fully healthy) that increases with node uptime.

In step 510, each node communicates its health status and its indexing status to the other nodes in the cluster via any known communication approach. In a preferred embodiment, this communication is done via a gossip protocol as would be understood by one of skill in the art in light of the teachings herein. It is to be noted that according to the present approach, a node sharing its health status as a decimal value, rather than repeatedly sharing uptime information and dropped updates as individual separate values, beneficially minimizes the amount of information traveling across the network via the gossip exchanges.

In step 515, one of the nodes in the cluster receives a client query from a client, thus making that node a coordinator node. For example, Node 5 in FIGS. 3 and 4 became the coordinator node by virtue of having received the client query from a client.

In step 520, the coordinator node determines which other nodes in the cluster contain data partitions that are relevant to the client query. For example, using techniques known in the art, Node 5 in FIGS. 3 and 4 determined that Nodes 1, 2, 3 and 4 were relevant because each contain data partitions within the client query involving a range of 0-1000. More particularly, Node 1 contains data partitions P1(0,250] and P4(750,1000], Node 2 contains data partitions P1(0,250] and P2(250,500], Node 3 contains data partitions P1(0,250], P2(250,500] and P3(500,750], and Node 4 contains data partitions P2(250,500], P3(500,750] and P4(750,1000].

In step 525, the coordinator node prioritizes the nodes determined in step 520 to be relevant to the client query. In one embodiment, such prioritization of relevant nodes ranks those nodes that are not busy performing a reindexing operation higher than those nodes that are busy performing a reindexing operation. In a further embodiment, such prioritization ranks those nodes with a larger value health index higher than those nodes with a smaller value health index. In the present approach, such prioritization can take any form or follow any process that ranks higher those nodes having a greater likelihood and ability to respond to a query request.

In a preferred embodiment, those nodes determined in step 520 to be relevant to the client query are prioritized or ranked in step 525 according to the following schema:

First, those nodes that are currently active (i.e., powered up and running) are ranked above those nodes that are not currently active (i.e., not powered up or running), it being understood that techniques for one node in a cluster to determine whether another node in the cluster is currently active are known in the art;

Second, those nodes which are not reindexing and whose last reindexing operation completed successfully are ranked higher than those nodes that are busy performing a reindexing operation or whose last reindexing operation did not complete successfully;

Third, those nodes that are closer (in greater physical proximity) to the coordinator node in the ring or cluster are ranked higher than those nodes that are further (in lesser physical proximity) from the coordinator node, it being understood that techniques for one node to determine physical proximity to another node in the cluster or ring are known in the art; and, Fourth, those nodes with a larger health index value are ranked higher than those nodes with a smaller health index value.

The following is a simplified example of this preferred prioritization ranking approach. In this example, as listed in the following table, there are six nodes from the given cluster that contain data partitions relevant to the client query. The following table shows the current status of each of those six nodes:

|  | Active | Index Status | Proximity | Health Status |
| --- | --- | --- | --- | --- |
| Node A | Yes | Indexing | Close | .99 |
| Node B | No | Failed | Close | .99 |
| Node C | Yes | Indexing | Close | .80 |
| Node D | Yes | — | Close | .50 |
| Node E | No | — | Far | .32 |
| Node F | Yes | — | Close | .99 |

Using the above preferred node prioritization schema, where the nodes of a cluster are evaluated relative to each other two at a time, results in a prioritization or rank order of these six nodes as follows: F, D, A, C, E, B. This results from the fact that, by reference to the above table:

Node F and Node D are both active, are both not busy indexing and neither experienced a failure with the last reindexing operation, are both close to the coordinator node, and Node F's health status value of 0.99 is larger than Node D's health status value of 0.50;

Node D and Node A are both active, and Node D is not busy reindexing and did not experience a failure with the last reindexing operation while Node A is busy reindexing;

Node A and Node C are both active, are both busy reindexing, are both close to the coordinator node, and Node A's health status value of 0.99 is larger than Node C's health status value of 0.80;

Node C is active while Node E is not active; and,

Node E and Node B are both not active, and Node E is not busy reindexing and did not experience a failure with the last reindexing operation while Node B experienced a failure with the last reindexing operation.

Referring again to FIG. 5, in step 530 the coordinator node sends query requests to the other nodes in the cluster based on the prioritization or rank order of the other replica nodes.

In step 535, the coordinator node receives query responses back from the other nodes. Of course, query responses are not received if one of the other nodes had a failure condition or there was some communication problem. As would be understood by one of skill in the art in light of the teachings herein, in various embodiments the coordinator node can determine that it has not, or will not, receive a query response back from a given replica node either because the coordinator node received a failure communication from or regarding the given replica node or because no query response was received by the coordinator node within a predetermined period of time after sending the query request to the given replica node.

In step 540, because a query response to a query request was not received from a node, the coordinator node sends the query request to the next highest priority replica node(s) containing the relevant data partitions. This may result in sending a single query request to a single other replica node if that other replica node contains all of the relevant data partitions of the replica node that did not provide a response to the original query request or may result in sending more than one query request to more than one other replica node if no single other replica node contains all of the relevant data partitions.

It is to be understood that step 540 is skipped and the process continues to step 545 if, in step 535, all query responses are received from the replica nodes to which query requests were sent. Further, as explained above, the first level benefit of the present approach has still been provided because query requests were only sent to nodes best able to respond.

It is also to be understood that step 540 may be repeated for other instances of replica nodes failing to provide query responses. As explained above, the second level benefit of the present approach is therefore provided because failure conditions are tolerated or ameliorated rather than causing an entire client query to fail.

In step 545, having received all of the query responses from the replica nodes, the coordinator node sorts the query responses into a client query result based on score or other relevancy factor, using one or more techniques known in the art.

In step 550, the coordinator node provides the client query result to the client, again using techniques known in the art.

As has now been explained, the present approach provides a fault tolerant query approach. In particular, the present approach can tolerate up to N−1 failures for any given data partition, where N is the data replication factor in the cluster, with no service loss and accuracy proportional to the node properties previously mentioned.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result or performance of all of the described steps.

There may be a single computing system, server or processor, or multiple computing systems, servers or processors performing different functions of the functions described herein, including those of a signal node described herein. One of skill in the art will appreciate how to determine which and how many of each will be appropriate for a specific intended application.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure. For example, steps 505, 510 and 525 of FIG. 5 can be performed in a continuous loop operating in parallel with one or more of the other steps of the figure, and step 525 can also be performed by each node with respect to the other nodes in the cluster regardless of whether any such node ever becomes a coordinator node, thereby repeatedly maintaining a prioritized list of nodes before, during and/or after any of the other steps in the figure.

These and other variations upon the embodiments described and shown herein are intended to be covered by the present disclosure, which is limited only by the appended claims.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A fault tolerant query method, in a cluster of nodes, the method comprising:
   determining, by each node in the cluster, its own health status wherein the health status is an indication of how likely the node is to provide correct data;
   determining, by each node in the cluster, its own indexing status by determining whether the node is currently undergoing a reindexing of its dataset partitions or if a most recent reindexing operation had failed;

communicating, from each node in the cluster to each other node in the cluster, the determined health status and the determined indexing status;
receiving a client query at a first node in the cluster;
determining, by the first node in the cluster, which nodes in the cluster contain data partitions relevant to the received client query;
prioritizing, by the first node in the cluster, the determined nodes using the received indexing status of the determined nodes and then the received health status of the determined nodes;
sending query requests from the first node in the cluster to one or more of the determined nodes having a higher priority than one or more other of the determined nodes having a lower priority;
receiving by the first node query responses from the one or more of the determined nodes having a higher priority;
sorting by the first node the received query responses into a query result; and,
sending the query result from the first node to the client.

2. The method of claim 1 further comprising before the step of sorting by the first node the received query responses into a query result:
determining by the first node that one or more query response is not being received from the one or more of the determined nodes having a higher priority;
sending one or more additional query request from the first node in the cluster to one or more of the determined nodes having a next higher priority than one or more other of the determined nodes having a higher priority; and,
receiving by the first node one or more query responses from the one or more of the determined nodes having a next higher priority.

3. The method of claim 1 wherein determining, by each node in the cluster, its own health status is according to the function:

$$\text{node health} = \text{node uptime}/(1+\text{dropped updates})$$

and where node uptime is calculated according to the function:

$$\text{round } (100\times(\text{uptime}\times\text{smoothing constant})/(1+\text{uptime}\times\text{smoothing constant}))/100.$$

4. The method of claim 1 wherein communicating the determined health status and the determined indexing status is performed using a gossip protocol.

5. The method of claim 1 wherein prioritizing the determined nodes based on the received health status and indexing status of the determined nodes further comprises prioritizing the determined nodes based on whether the determined nodes are active and the proximity of each of the determined nodes to the first node in the cluster.

6. A fault tolerant query system comprising:
a cluster of nodes, each node in the cluster configured to:
determine its health status wherein the health status is an indication of how likely the node is to provide correct data;
determine its indexing status by determining whether the node is currently undergoing a reindexing of its dataset partitions or if a most recent reindexing operation had failed; and
communicate its determined health status and determined indexing status to each other node in the cluster;
at least one node in the cluster configured to:
receive a client query,
determine which nodes in the cluster contain data partitions relevant to the received client query;
prioritize the determined nodes using the received indexing status of the determined nodes and then the received health status of the determined nodes;
send query requests to one or more of the determined nodes having a higher priority than one or more other of the determined nodes having a lower priority;
receive query responses from the one or more of the determined nodes having a higher priority;
sort the received query responses into a query result; and,
send the query result to the client.

7. The system of claim 6 wherein the at least one node in the cluster is further configured to:
determine that one or more query response is not being received from the one or more determined nodes having a higher priority;
send one or more additional query request to one or more of the determined nodes having a next higher priority than one or more other of the determined nodes having a higher priority; and,
receive one or more query response from the one or more of the determined nodes having a next higher priority,
before being configured to sort the received query responses into the query result.

8. The system of claim 6 wherein each node in the cluster configured to determine its health status is according to the function:

$$\text{node health} = \text{node uptime}/(1+\text{dropped updates})$$

and where node uptime is calculated according to the function:

$$\text{round } (100\times(\text{uptime}\times\text{smoothing constant})/(1+\text{uptime}\times\text{smoothing constant}))/100.$$

9. The system of claim 6 wherein each node configured to communicate its determined health status and determined indexing status uses a gossip protocol.

10. The system of claim 6 wherein the at least one node configured to prioritize the determined nodes based on the communicated health status and indexing status of the determined nodes is configured to prioritize the determined nodes based on whether the determined nodes are active and the proximity of each of the determined nodes to the at least one node in the cluster.

11. A non-transitory computer readable storage medium having embodied thereon a program, the program being executable by a processor to perform a fault tolerant query method, in a cluster of nodes, the method comprising the steps of:
determining, by each node in the cluster, its own health status wherein the health status is an indication of how likely the node is to provide correct data;
determining, by each node in the cluster, its own indexing status by determining whether the node is currently undergoing a reindexing of its dataset partitions or if a most recent reindexing operation had failed;
communicating, from each node in the cluster to each other node in the cluster, the determined health status and the determined indexing status;
receiving a client query at a first node in the cluster;
determining, by the first node in the cluster, which nodes in the cluster contain data partitions relevant to the received client query;

prioritizing, by the first node in the cluster, the determined nodes using the received indexing status of the determined nodes and then the received health status of the determined nodes;

sending query requests from the first node in the cluster to one or more of the determined nodes having a higher priority than one or more other of the determined nodes having a lower priority;

receiving by the first node query responses from the one or more of the determined nodes having a higher priority;

sorting by the first node the received query responses into a query result; and, sending the query result from the first node to the client.

12. The non-transitory computer readable storage medium of claim 11, wherein the method further comprises the steps of, before the step of sorting by the first node the received query responses into a query result:

determining by the first node that one or more query response is not being received from the one or more of the determined nodes having a higher priority;

sending one or more additional query request from the first node in the cluster to one or more of the determined nodes having a next higher priority than one or more other of the determined nodes having a higher priority; and, receiving by the first node one or more query responses from the one or more of the determined nodes having a next higher priority.

13. The non-transitory computer readable storage medium of claim 11 wherein determining, by each node in the cluster, its own health status is according to the function:

$$\text{node health} = \text{node uptime}/(1+\text{dropped updates})$$

and where node uptime is calculated according to the function:

$$\text{round }(100\times(\text{uptime}\times\text{smoothing constant})/(1+\text{uptime}\times\text{smoothing constant}))/100.$$

14. The non-transitory computer readable storage medium of claim 11 wherein communicating the determined health status and the determined indexing status is performed using a gossip protocol.

15. The non-transitory computer readable storage medium of claim 11 wherein prioritizing the determined nodes based on the received health status and indexing status of the determined nodes further comprises prioritizing the determined nodes based on whether the determined nodes are active and the proximity of each of the determined nodes to the first node in the cluster.

* * * * *